Jan. 26, 1960

D. W. FOX ET AL 2,922,291

AIRBORNE EVAPORATIVE COOLING SYSTEM

Filed May 1, 1959

DAVID W. FOX
ROBERT M. RIVELLO
INVENTOR.

BY
ATTORNEYS

United States Patent Office 2,922,291
Patented Jan. 26, 1960

2,922,291

AIRBORNE EVAPORATIVE COOLING SYSTEM

David W. Fox, Hyattsville, and Robert M. Rivello, Silver Spring, Md., assignors to the United States of America as represented by the Secretary of the Navy Application May 1, 1959, Serial No. 810,516

14 Claims. (Cl. 62—171)

This invention relates to cooling systems, and more particularly to an airborne evaporative cooling system for aerial vehicles.

Considerations in the design of high Mach number ramjet or rocket missiles must necessarily include means for protecting certain components from high temperatures induced by aerodynamic heating. An obvious approach, and one that would appear to be simple and reliable, includes primarily the use of insulation; however, the weight and space demands of any such insulation, if it is to be effective especially for longer flights, can be excessive.

A different and novel approach involves not only the thermal isolation of the components to be protected, but also the combination of cooling means integrally with the isolating or insulating means. Such an arrangement can be used adjacent the missile components to provide thermal protection thereof, or the arrangement can be positioned next to the missile outer skin. When used in this latter manner, the cooling system in lowering the skin temperature permits the use of lightweight alloys such as those of aluminum or magnesium, in the missile structure. Additionally, the effect of the cooled skin may induce laminar boundary layer conditions with resultant drag reduction.

It is the object, therefore, of the present invention to provide an effective, compact and lightweight cooling system for a missile for protecting the various structural electronic, hydraulic and warhead components from the high temperatures encountered during flights of relatively long duration. The present invention also provides a cooling system in which insulation acts as coolant distributing means thereby resulting in a design that is simple, inexpensive, relatively compact and efficient. The cooling system is also capable of being stored in a ready to use condition with no requirement for servicing or maintenance.

Other advantages and many of the attendant advantages of this invention will be readily appreciated as the same becomes better understood by reference to the following detailed description when considered in connection with the accompanying drawings.

Briefly, the present invention contemplates an evaporative cooling system for a missile in which a coolant saturated layer of lightweight insulation is completely enclosed in a container that is positioned in spaced relationship to the missile component to be cooled. The space between the component and the container is vented to ambient pressures and is provided with spacers which form channels therein. The container wall nearest the component is apertured with a plurality of vent holes which are sealed by plugs of low melting temperature material. During high speed flight when the heat induced in the missile skin is conducted to the container, the plugs melt to vent the saturated insulation to atmosphere. Further temperature rise causes the coolant in the saturated insulation to vaporize, the resulting vapor escaping through the vent holes and passing through the channels to be vented overboard. Thus heat is absorbed and removed in several ways: Firstly, by the vaporization process which will remove an amount of heat per pound of coolant equal to the latent heat of vaporization of the coolant, and secondly, by contact of the escaping and relatively cool vapor with the heated adjacent areas. When the coolant is completely expended, the insulation remains to provide thermal protection.

Figure 1:
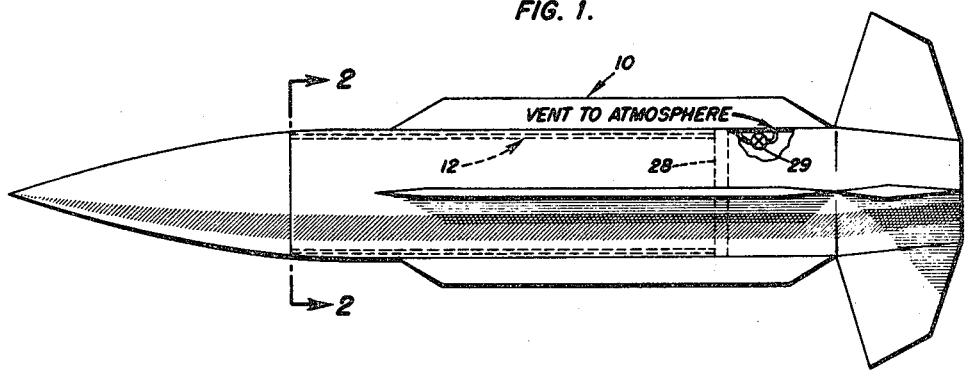
Fig. 1 is an elevation, partly in section of a missile employing a cooling system of the present invention.
Figure 3:
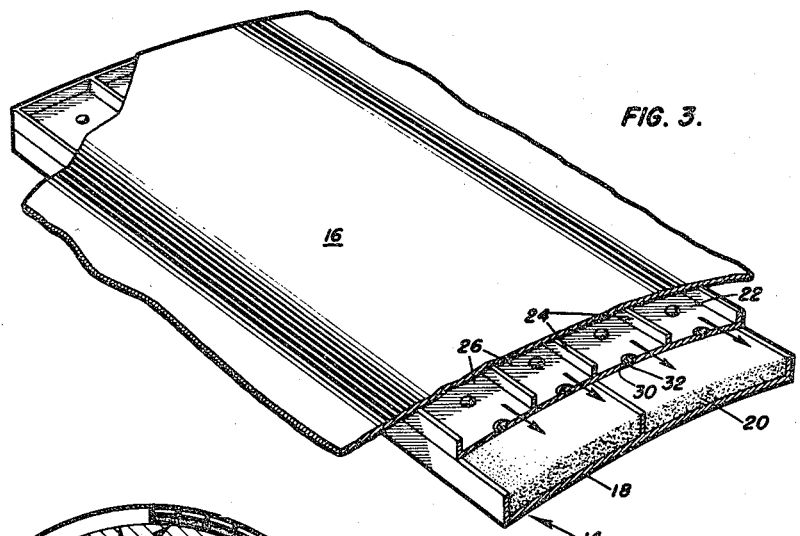
Fig. 3 is a perspective, partly in section, of a segment of the cooling system.
Figure 2:
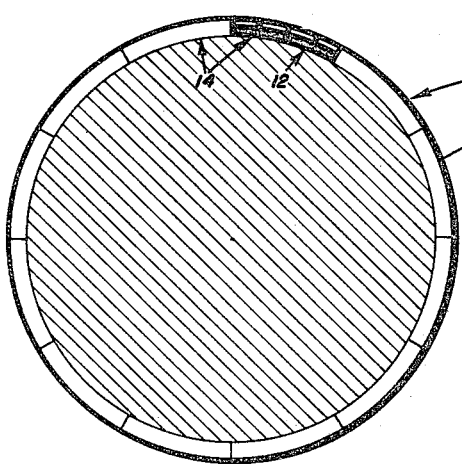
Fig. 2 is a section on line 2—2 of Fig. 1.

Referring now to the drawings in greater detail, Fig. 1 shows a missile 10 utilizing an evaporative cooling system 12 constituting the present invention. Although the cooling system 12 is shown as extending over only a portion of the missile 10, it is to be understood that practically as much, or if desired, as little of the missile may be cooled by the system. As can be seen in Figs. 2 and 3, the cooling system 12 is of annular cross section and comprises a plurality of segments 14, which are positioned in spaced relationship to the missile skin 16. Each of the segments 14 includes a tray 18 containing a layer of highly absorbent, low density thermal insulation 20 such as a material commercially known as "Q-Felt." The insulation 20 is saturated with a coolant 21, which may be water, and completely enclosed in the tray 18 by a cover 22 that is cemented or otherwise suitably attached on the tray. The selection of a suitable coolant is made on the basis of the skin temperatures anticipated, the temperature limitations of the various missile components to be thermally protected, the boiling point and heat of vaporization of the coolant, etc. For the purpose of maintaining the tray 18 and cover 22 in spaced relationship to the missile skin 16, spacers 24 are provided on the top of the cover and can be formed integrally thereon. The spacers 24 form substantially longitudinal channels 26 between the missile skin 16 and the cover 22, and as best seen in Fig. 1, these channels 26 lead into an annular manifold 28 which is vented to atmosphere through a pressure regulating valve 29. A plurality of apertures 30 extend through the cover 22 and are sealed with plugs 32 of low melting temperature material such as paraffin wax, alloys of antimony, bismuth, lead, etc.

In use, when the missile 10 is traveling at high Mach numbers and the skin 16 is subject to aerodynamic heating, the resulting elevated temperatures of the skin and the cover 22 cause the plugs 32 to melt, thereby venting the saturated insulation 20 to ambient pressures. As the skin and cover temperatures continue to rise, the coolant 21 begins to boil as the boiling point, now lowered considerably by the lower ambient pressure, is reached. The pressure regulating valve 29 functions at the higher altitude to prevent the pressure in the system from falling to a value where boiling would occur too rapidly for effective cooling.

As the coolant is vaporized, heat is, of course, absorbed, tending to cool the tray and skin. Further cooling is effected by removal of sensible heat when the coolant vapor traveling through the channels 26 contacts the skin 16. The coolant vapor is then collected in the manifold 28 to be vented overboard. After all of the coolant has thus been vaporized, thermal protection is still being provided in the form of the insulation 20.

Obviously many modifications and variations of the present invention are possible in the light of the above teachings. It is therefore to be understood that within scope of the appended claims, the invention may be practiced otherwise than as specifically described.

What is claimed is:

1. An evaporative cooling system for a high Mach number aerial vehicle, said vehicle being subject to aerodynamic heating and having an outer skin and components which must be protected from overheating, comprising, a plurality of closed containers positioned in spaced relationship to said skin, a coolant enclosed in said containers, means on said containers and operable at a predetermined temperature for communicating the inside and outside of said containers, structure cooperating with said containers and missile skin to form a plurality of channels therebetween, and means for venting each of said channels to ambient pressures.

2. The apparatus as recited in claim 1 with additionally a layer of insulation in each of said containers.

3. The apparatus as recited in claim 1 wherein said coolant includes water.

4. The apparatus as recited in claim 1 wherein said first mentioned means includes a plurality of apertures extending through a wall of each of said containers, and a plug engageable with each of said apertures in sealed relationship, said plugs being formed of material having a relatively low melting point.

5. The apparatus as recited in claim 1 wherein said structure includes a plurality of longitudinal spacers positioned between said missile skin and said container.

6. The apparatus as recited in claim 1 wherein said first mentioned means includes a manifold communicating with each of said channels, said manifold being vented to ambient pressures.

7. An evaporative cooling system for a high Mach number aerial vehicle subject to aerodynamic heating, said vehicle having an outer skin and various components which must be protected from high temperatures, comprising, a plurality of trays positioned in spaced relationship to said outer skin, a layer of insulation in each of said trays, a coolant in said trays and saturating said insulation, a cover on each of said trays and engageable therewith in sealed relationship, a plurality of apertures in said cover and extending therethrough, a plug for each of said apertures and engageable therewith to close said apertures, said plugs being formed of low melting point material, a plurality of spacers on said cover and maintaining said cover in spaced relationship to said outer skin, said spacers forming a plurality of channels between said cover and said outer skin, and a manifold for said channels, said manifold being vented to ambient pressures.

8. In a high Mach number aerial missile having an outer skin and components which must be protected from extreme temperatures due to aerodynamic heating, the combination therewith of any evaporative cooling system comprising, structure within said missile defining an inner and an outer chamber, one wall of said outer chamber comprising said missile outer skin, a layer of insulation in said inner chamber, a coolant in said inner chamber and saturating said insulation, means operable at a predetermined temperature for communicating said inner and outer chambers, additional structure in said outer chamber and defining a plurality of channels therein, and means for venting each of said channels to ambient pressures.

9. An evaporative cooling system for a high Mach number aerial vehicle subject to aerodynamic heating, said vehicle having an outer skin and various components which must be protected from high temperatures, comprising, a plurality of trays positioned in spaced relationship to said outer skin, a coolant in said trays, a cover on each of said trays and engageable therewith in sealed relationship, a plurality of spacers on said cover and maintaining said cover in spaced relationship to said outer skin, said spacers forming a plurality of channels between said cover and said outer skin, a manifold for said channels, said manifold being vented to ambient pressures, and means on said cover and including temperature responsive means for communicating the interior of said trays with said channels.

10. The evaporative cooling system as recited in claim 9 with additionally a layer of insulation in said trays.

11. The evaporative cooling system as recited in claim 9 wherein said first-mentioned means includes a plurality of apertures in said cover and extending therethrough, a plug for each of said apertures and engageable therewith to close said apertures, said plugs being formed of low melting point material.

12. In a high Mach number aerial missile having an outer skin and components which must be protected from extreme temperatures due to aerodynamic heating, the combination therewith of an evaporative cooling system, comprising, structure within said missile defining an inner and an outer chamber, one wall of said outer chamber comprising said missile outer skin, a coolant in said inner chamber, means operable at a predetermined temperature for communicating said inner and outer chambers, additional structure in said outer chamber and defining a plurality of channels therein, and means for venting each of said channels to ambient pressures.

13. In a high Mach number aerial missile having an outer skin and components which must be protected from extreme temperatures due to aerodynamic heating, the combination therewith of an evaporative cooling system, comprising, structure within said missile defining an inner and an outer chamber, one wall of said outer chamber comprising said missile outer skin, said containers having a common wall, a coolant in said inner chamber, means operable at a predetermined temperature for communicating said inner and outer chambers and including a plurality of apertures in said common wall and extending therethrough, a plug for each of said apertures and engageable therewith to close said apertures, said plugs being formed of low melting point material, additional structure in said outer chamber and defining a plurality of channels therein, and means for venting each of said channels to ambient pressures.

14. In a high Mach number aerial missile having an outer skin and components which must be protected from extreme temperatures due to aerodynamic heating, the combination therewith of an evaporative cooling system, comprising, structure within said missile defining an inner and an outer chamber in juxtaposition, one wall of said outer chamber comprising said missile outer skin, a layer of insulation in said inner chamber, a coolant in said inner chamber and saturating said insulation, means operable at a predetermined temperature for communicating said inner and outer chambers and including a plurality of apertures in the adjacent walls of said containers and extending therethrough, a plug for each of said apertures and engageable therewith to close said apertures, said plugs being formed of low melting point material, additional structure in said outer chamber and defining a plurality of channels therein, and means for venting each of said channels to ambient pressures.

References Cited in the file of this patent

UNITED STATES PATENTS 2,522,113     Goddard             Sept. 12, 1950